(12) United States Patent
Seeker et al.

(10) Patent No.: US 6,865,994 B2
(45) Date of Patent: Mar. 15, 2005

(54) STEP-DIFFUSER FOR OVERFIRE AIR AND OVERFIRE AIR/N-AGENT INJECTOR SYSTEMS

(75) Inventors: William Randall Seeker, San Clemente, CA (US); Roy Payne, Mission Viejo, CA (US); Larry William Swanson, Laguna Hills, CA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 10/249,379

(22) Filed: Apr. 3, 2003

(65) Prior Publication Data

US 2004/0194680 A1 Oct. 7, 2004

(51) Int. Cl.[7] .............................. F23B 5/00; F23G 7/06; F23J 15/00
(52) U.S. Cl. .................. 110/345; 110/214; 110/265; 110/203; 431/181; 431/348
(58) Field of Search .................. 110/203, 264, 110/265, 308, 345, 344, 342, 213, 214, 215; 431/4, 8, 181, 159, 348

(56) References Cited

U.S. PATENT DOCUMENTS

| 851,346 | A | * | 4/1907 | Darling ........................ 431/181 |
| 3,219,094 | A | * | 11/1965 | Lempa ........................ 431/181 |
| 3,315,726 | A | * | 4/1967 | Williams ........................ 431/89 |
| 4,416,620 | A | * | 11/1983 | Morck ........................ 431/348 |
| 5,139,755 | A | | 8/1992 | Seeker et al. |
| 5,756,059 | A | | 5/1998 | Zamansky et al. |
| 6,101,957 | A | | 8/2000 | Wilson et al. |
| 6,280,695 | B1 | | 8/2001 | Lissianski et al. |

FOREIGN PATENT DOCUMENTS

| DE | 0253324 | * | 1/1988 | ........... B01D/53/34 |
| GB | 2004052 A | * | 3/1979 | ........... F23D/13/12 |

* cited by examiner

Primary Examiner—Kenneth Rinehart
(74) Attorney, Agent, or Firm—Nixon & Vanderhye P.C.

(57) ABSTRACT

An overfire air injector for use in a fossil fuel-fired combustion device includes a cylindrical nozzle having an outlet end formed with a step diffuser comprising one or more radial steps that enlarge the outlet end of the nozzle. An atomizer lance may be mounted within the nozzle, having a discharge orifice at the outlet end of the nozzle, for supplying a reducing agent to the overfire air to reduce NOx emissions.

11 Claims, 2 Drawing Sheets

STEP-DIFFUSER FOR OVERFIRE AIR AND OVERFIRE AIR/N-AGENT INJECTOR SYSTEMS

BACKGROUND OF INVENTION

The present invention is related to Overfire Air systems for reducing nitrogen oxide emissions in combustion systems. More specifically, the present invention provides a step diffuser at the Overfire Air injector outlet end to enhance mixing of air with flue gas to improve Overfire Air system performance.

One of the major problems in modern industrial society is the production of air pollution by a variety of combustion systems, such as boilers, furnaces, engines, incinerators and other combustion sources. One of the oldest recognized air pollution problems is the emission of oxides of nitrogen (NOx). In modern boilers and furnaces, NOx emissions can be eliminated or at least greatly reduced by the use of overfire air (OFA) technology. In this technology, most of the combustion air goes into the combustion chamber together with the fuel, but addition of a portion of the combustion air is delayed to yield oxygen deficient conditions initially and then to facilitate combustion of CO and any residual fuel.

OFA systems rely on the momentum of the OFA jets to provide effective mixing with the flue gas stream. For a given OFA mass flow rate, penetration into the flue gas stream and the rate of mixing is controlled by the size and number of individual OFA jets and by their corresponding velocity. Higher velocities and small openings result in faster mixing rates, while larger openings lead to better penetration of the air into the flue gas stream. In practical combustion systems, the maximum OFA velocity which can be applied is typically limited by the pressure inventory available in the combustion air supply system, such that mixing rate and jet penetration cannot be controlled independently.

Current OFA systems can apply some passive or active methods for controlling near field mixing. In these systems, large-scale flow structures may be generated that significantly reduce mixing effectiveness near the injector outlet. This leads to the need for higher airflow velocities that may not be attainable due to pressure inventory limitations.

Additionally, there is one embodiment of the SNCR process in which SNCR reagent is injected together with the OFA (AOFA/SNCR). At the high gas temperatures (1700–2400° F.) and moderate to high CO concentrations (0.2–1.0 percent) typical of AOFA/SNCR applications, CO competes with active species that are critical to NOx reduction thermochemistry. This reduces the effectiveness of the AOFA/SNCR process.

Earlier applications of the AOFA/SNCR process circumvented the CO oxidation problem by injecting very large reagent droplets into the overfire air. The droplets were carried by the gas through the boiler, eventually releasing N-agent into an optimal temperature window well downstream of the overfire air injectors where low CO concentrations exist. Unfortunately, the design of large droplet systems is difficult due to long droplet residence times, a tortuous flow path with obstructions, and often a narrow N-agent release temperature window. The N-agent can also generate NOx if it is released at higher temperatures upstream of the optimum temperature window. Ammonia slip can become an issue if the N-agent is released at lower temperatures downstream of the optimum temperature window.

SUMMARY OF INVENTION

This invention seeks to retain the large-scale flow structure characteristics that contribute to penetration but to enhance small-scale mixing in the near-field and at the periphery of the jet. The improved mixing efficiency lowers both the airflow velocity requirement and pressure inventory requirement. The enhanced mixing also improves local CO oxidation in standard OFA applications, which in turn improves SNCR performance in AOFA/SNCR applications.

Specifically, this invention enhances the mixing of OFA jets, and reduces the carbon monoxide concentration in high temperature flue gas near the OFA injectors in a fossil fuel-fired boiler or furnace. The exemplary embodiment uses a simple passive step-diffuser configuration at the injector outlet to induce vigorous air/flue gas mixing near the injector outlet at the edge of the mixing plume for enhanced CO oxidation and improved overall OFA performance. In AOFA/SNCR an SNCR atomizer lance installed in each injector distributes the N-agent to the oxidized gas yielding significantly improved NOx reduction levels relative to conventional OFA/N-agent injector systems.

In accordance with the invention, the step-diffuser overfire air injector system may incorporate a single port, multiple-concentric ports, or multiple-adjacent-compartments in a single OFA injector system. For AOFA/SNCR systems, the N-agent atomizer lance is mounted in the OFA injector, along or offset from the center axis of the injector. Small droplets or gas are used to release the N-agent near the tip or outlet end of the OFA injector nozzle. This oxidizes the CO by intense small-scale mixing near the OFA injectors, prior to contacting the N-agent.

The step-diffuser may consist of a single step or be comprised of a series of steps, and the length to height ratio of the steps usually ranges from about 2–10. For multiple port configurations, the steps may be placed on any of the ports to enhance CO oxidation and N-agent thermal shielding. In the exemplary embodiment, a single circular OFA injector system is provided with a step-diffuser having a series of three steps, with the N-agent atomizer lance mounted along the center axis of the OFA injector nozzle. Flue gas, with moderate to high CO concentrations, flows upward from the boiler primary burner region into the overfire air region where it vigorously mixes with the highly turbulent overfire air. This enhances CO oxidation and improves N-agent effectiveness by reducing the competition between CO and NOx for active species critical to SNCR NOx reduction chemistry.

Accordingly, in one aspect, the invention relates to an overfire air injector for use in a fossil fuel-fired combustion device comprising a cylindrical nozzle having an outlet end formed with a step diffuser comprising at least one radial step that enlarges the outlet end of the nozzle.

In another aspect, the invention relates to a fossil fuel-fired boiler incorporating a combustion device comprising a plurality of main burners supplied with fossil fuel and air supplied into a combustion zone that flows from the combustion zone to a burnout zone; and at least one overfire air injector for supplying overfire air to the burnout zone, wherein the overfire air injector comprises a cylindrical nozzle having an outlet end formed with a step-diffuser comprising at least one radial step that enlarges the outlet end of the nozzle.

In still another aspect, the invention relates to a fossil fuel-fired boiler incorporating a combustion device comprising a plurality of main burners supplied with fossil fuel and air for burning in a combustion zone where flue gases are produced that flow from the combustion zone into a burnout zone; and at least one overfire air injector adapted to supply overfire air to the burnout zone, wherein the overfire air injector comprises a cylindrical nozzle having an outlet end formed with a step-diffuser defined by a plurality of radial steps that enlarge the outlet end of the nozzle; and an atomizer lance mounted within the nozzle along a center axis thereof, having a discharge orifice at the outlet end of the nozzle.

This invention will be described in detail in accordance with the drawings identified below.

DETAILED DESCRIPTION

Figure 1:
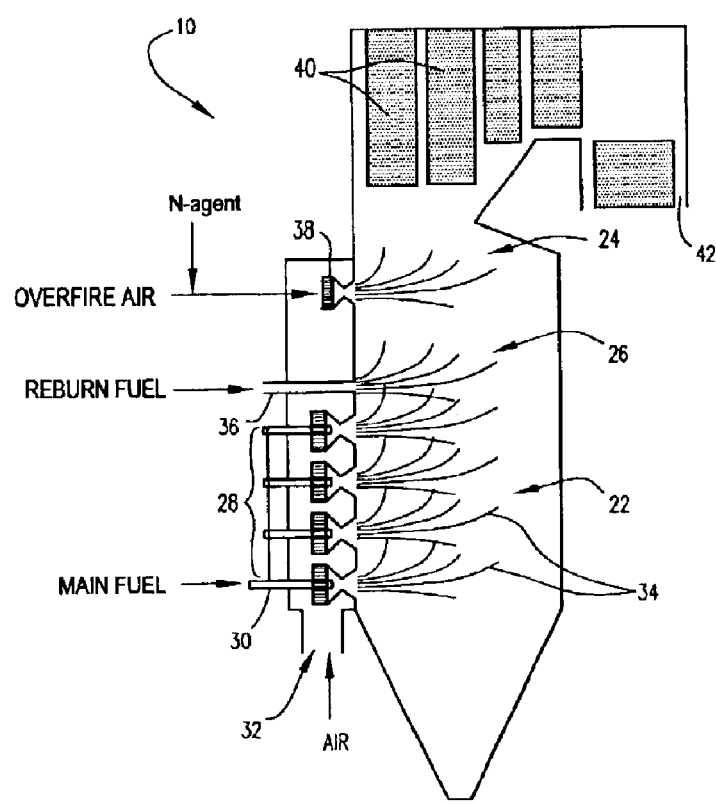
FIG. 1 is a schematic side elevation of a known fossil fuel-fired combustion device.

Referring now to FIG. 1, there is a schematic representation of a fossil fuel-fired combustion device 10 such as used in a fossil fuel-fired boiler or furnace. combustion device 10 includes a combustion zone 22 and a burnout zone 24. The combustion device 10 may also include a reburning zone 26 between the combustion and reburning zones. The combustion zone 22 is equipped with at least one, and preferably a plurality of main burners 28 which are supplied with a main fuel such as fossil fuel through a fuel input 30, and with air through an air input 32. The main fuel is burned in the combustion zone 22 to form a combustion flue gas 34 that flows upwardly from the combustion zone 22 toward the burnout zone 24, a direction referred to herein as a "downstream" direction. When the optional reburning zone 26 is used, typically about 75%–85% of the total heat input is supplied through main burners 28, and the remaining 15%–25% of heat is supplied by injecting a reburn fuel such as natural gas through a reburn fuel input 36. Downstream of the reburning zone 26, overfire air is injected through an overfire air or OFA injector 38 into the burnout zone 24. The combustion flue gas 34 passes through a series of heat exchangers 40, and any solid particles are removed by a particulate control device (not shown), such as an electrostatic precipitator ("ESP") or baghouse. The flue gases exit the boiler or furnace at the outlet 42.

A selective reducing agent (N-agent) may be added to the overfire air prior to or concurrently with injection of the overfire air into burnout zone 24. As used herein, the terms "selective reducing agent" and "N-agent" are used interchangeably to refer to any of a variety of chemical species capable of selectively reducing NOx in the presence of oxygen in a combustion system. In general, suitable selective reducing agents include urea, ammonia, cyanuric acid, hydrazine, thanolamine, biuret, triuret, ammelide, ammonium salts of organic acids, ammonium salts of inorganic acids, and the like.

Figure 2:
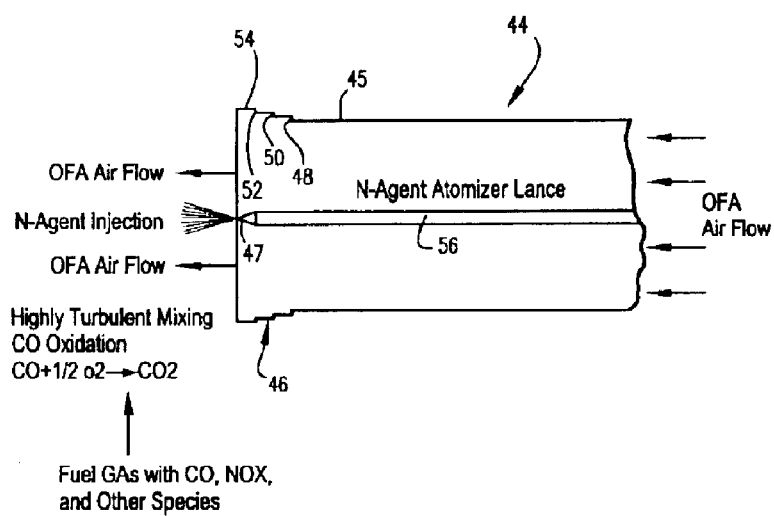
FIG. 2 is a schematic partial side elevation of an outlet end of an overfire air injector incorporating a step diffuser in accordance with a preferred embodiment of the invention.

Turning to FIG. 2, a cylindrical OFA injector 44 in accordance with an exemplary embodiment of the invention is shown for injecting overfire air into the reburning zone 24. The injector includes a cylindrical nozzle 45 formed with a step-diffuser 46 at its outlet end. The step-diffuser 46 in the exemplary embodiment is formed with three radial steps 48, 50 and 52 that effectively enlarge in step-wise fashion the diameter of the outlet end or tip of the nozzle, with the largest diameter at 54. It will be appreciated, however, that the step-diffuser may consist of a single step or a series of steps, including more than three. The length to height ratio of the steps is preferably in the range of from about 2 to 10.

For multiple port configurations, the steps may be placed on any or all of the ports to enhance CO oxidation and N-reagent thermal shielding.

The presence of the step-diffuser 46 improves mixing efficiency and lowers both the airflow velocity requirement and pressure inventory requirement.

In the exemplary embodiment, an N-agent atomizer lance 56 may be mounted along the center axis (other orientations may be chosen) of the nozzle 44. With reference again to FIG. 1, flue gas, with moderate to high CO concentrations, flows upward from the boiler combustion zone 22, through the reburning zone 26 and into the overfire air region, or burnout zone 24, where it vigorously mixes with the highly turbulent overfire air. Specifically, the N-agent is released from the discharge orifice at the tip or outlet end 47 of the lance, and does not contact the flue gases until after the oxidation of CO by the intense small scale mixing in the area surrounding the lance 56. This improves N-agent effectiveness by reducing the competition between CO and NOx for active species critical to SNCR NOx reduction. As best seen in FIG. 2, the axially arranged discharge orifice of the lance is located at the tip of the outlet end of the nozzle.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An overfire air injector for use in a fossil fuel-fired combustion device comprising a cylindrical nozzle having an outlet end formed with a step diffuser formed with a series of three radial steps that enlarge said outlet end of said nozzle, wherein an atomizer lance is mounted along a center axis of the nozzle with an axially arranged discharge orifice at an outer tip of the outlet end of the nozzle, and wherein said series of three radial steps have a length to height ratio in a range of 2–10.

2. A fossil fuel-fired boiler incorporating an overfire air injection system for reducing NOx emissions, the boiler comprising a combustion device including a plurality of main burners supplied with fossil fuel and air for burning in a combustion zone, producing flue gases that flow from the combustion zone into a burnout zone; at least one overfire air injector supplying overfire air to the burnout zone, wherein the overfire air injector comprises a cylindrical nozzle having an outlet end formed with a step-diffuser comprising at least one radial step that enlarges said outlet end of said nozzle and that, in use, enhances mixing of the overfire air with the flue gases near said outlet end of said nozzle for oxidation of carbon monoxide and burning of residual fuel in the flue gases, and wherein the overfire air injector further comprises an atomizer lance mounted along a center axis of the nozzle, having a discharge orifice at the outlet end of the nozzle for introducing an NOx reducing agent into the flue gases.

3. The fossil fuel-fired boiler of claim 2 wherein said step-diffuser comprises between one and three radial steps.

4. The fossil fuel-fired boiler of claim 2 wherein said step diffuser comprises at least three radial steps.

5. The fossil fuel-fired boiler of claim 2 wherein said step diffuser comprises a plurality of radial steps, with a length to height ratio of the steps in a range of 2–10.

6. A fossil fuel-fired boiler incorporating an overfire air injection system for reducing NOx emissions, the boiler comprising a combustion device including a plurality of main burners supplied with fossil fuel and air for burning in a combustion zone where flue gases containing carbon monoxide are produced that flow from the combustion zone into a burnout zone; and at least one overfire air injector adapted to supply overfire air to the burnout zone, wherein the overfire air injector comprises a cylindrical nozzle having an outlet end formed with a step-diffuser defined by a plurality of radial steps that enlarge said outlet end of the nozzle and that, in use, enhance mixing of the overfire air with the flue gases near said outlet end of said nozzle for oxidation of carbon monoxide and burning of residual fuel in the flue gases, and wherein the overfire air injector further comprises an atomizer lance mounted within the nozzle along a center axis thereof and having a discharge orifice at the outlet end of the nozzle for introducing an NOx reducing agent into the flue gases.

7. The fossil fuel-fired boiler of claim 6 said combustion device further comprises a reburning zone between said combustion zone and said burnout zone, and wherein reburn fuel is supplied to the reburning zone.

8. A method of enhancing mixing of overfire air and flue gases containing carbon monoxide in a combustion system that is designed to reduce nitrogen oxide emissions comprising:

a) arranging an overfire air injector in a burnout zone downstream of a combustion zone, the overfire air injector including a cylindrical nozzle with an axially oriented outlet end; and b) shaping the outlet end to include a radial step diffuser with at least one radial step that enlarges the outlet end of the nozzle; and c) during combustion, supplying overfire air through said nozzle and radial step diffuser into the burnout zone for oxidizing carbon monoxide and burning residual fuel in the flue gases.

9. The method of claim 8 wherein said step diffuser comprises at least three radial steps.

10. The method of claim 8 and further comprising:

d) adding an atomizer lance co-axially within the nozzle, and supplying a selective NOx reducing agent through said atomizer lance into the burnout zone.

11. The method of claim 10 wherein said selective NOx reducing agent is chosen from a group consisting essentially of urea, ammonia, cyanuric acid, ammonium salts of organic acids and ammonium salts of inorganic acids.

* * * * *

UNITED STATES PATENT AND TRADEMARK OFFICE
CERTIFICATE OF CORRECTION

PATENT NO. : 6,865,994 B2
DATED : March 15, 2005
INVENTOR(S) : Seeker et al.

It is certified that error appears in the above-identified patent and that said Letters Patent is hereby corrected as shown below:

Column 5,
Line 18, after the numeral "6" insert the word -- wherein --

Signed and Sealed this

Nineteenth Day of July, 2005

JON W. DUDAS
*Director of the United States Patent and Trademark Office*